M. HALLENBECK.
Harvester.
No. 20,271.
Patented May 18, 1858
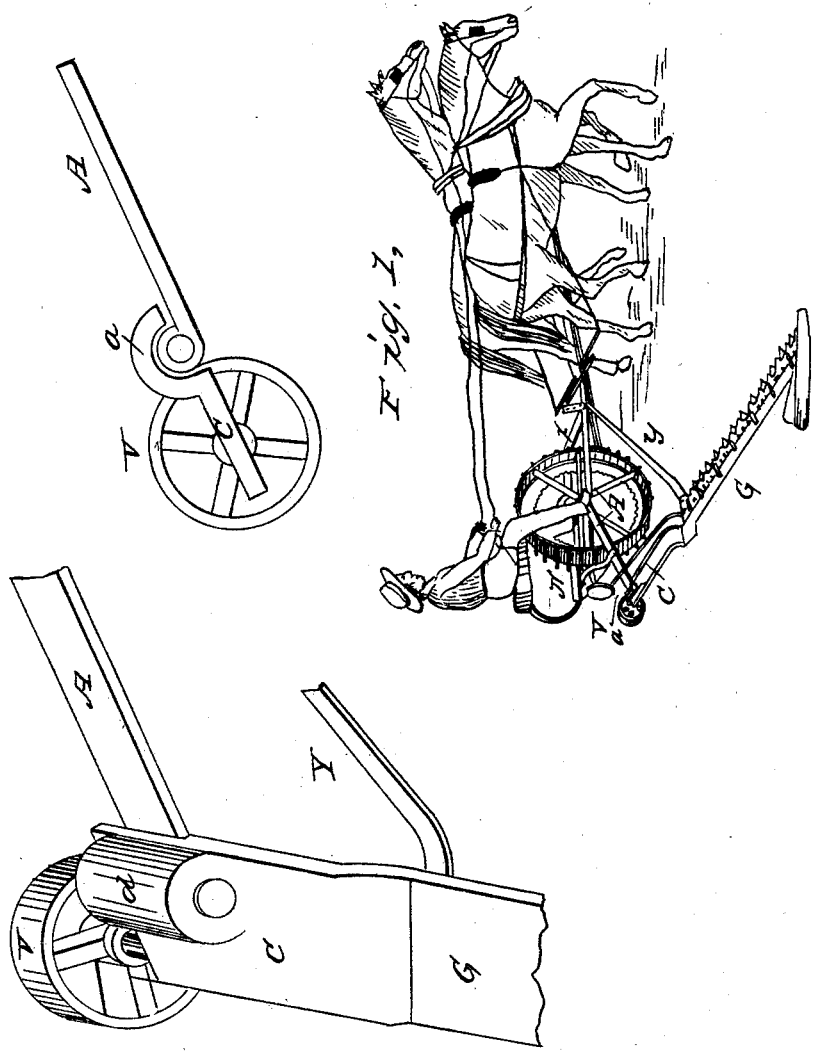

UNITED STATES PATENT OFFICE.

M. HALLENBECK, OF ALBANY, NEW YORK.

IMPROVEMENT IN HARVESTERS.

Specification forming part of Letters Patent No. 20,271, dated May 18, 1858.

*To all whom it may concern:*

Be it known that I, MARTIN HALLENBECK, of the city of Albany, State of New York, have invented certain Improvements in the Construction of Grain or Grass Harvesters; and I declare the following specification, with the drawings hereto annexed as a part of the same, to be a full and perfect description thereof.

Figure 1 is a perspective view of the entire machine. Fig. 2 is an enlarged view of parts of the machine shown in Fig. 1.

Similar letters in the different figures denote the same parts of the machine.

In the accompanying drawings it will be seen that I carry the bar A, which is on the off or heel-bar side of the machine, horizontally and parallel with the near bar N from the front bar toward the rear, just so far past the axle of the wheel as to give room to fasten the axle-box to it, and then from the box the bar is carried down obliquely to the tail-bar C of the frame, by which the heel-bar G connects with it. This shape of the frame permits the grass and stalks to pass with the least possible obstruction under the bar, and still allows the arrangement of the machinery to the best advantage for use. This tail-bar C, at its rear edge, is made (as shown in the drawings) to range a little above the line of the upper surface of the heel-bar, and its front edge still higher, the bar in the direction of its breadth ranging with the oblique line of bar A. This position is important to pass the stems or stubble of grass or grain, over which the frame passes, under the machine to the rear.

In order to accomplish the lifting up of the fingers and cutters so as to vary the cutting-angle, or to carry them above stones and small obstacles, the tail-bar C is attached to the bar A by a strong hinge, *a*, (see Fig. 2,) which permits it to be moved up or down a few degrees.

From near the point of junction of bars C and A a stout arm or lever, Y, is carried up to near the front end of bar A and there attached to an arm or arc, X, by set-screws or otherwise, by which the proper pitch of the cutting apparatus can be adjusted and set.

To the inner end of bar C, just outside of the hinge *a*, a small wheel, V, is attached to support the rear of the machine and steady the heel-bar, the outer end being supported off the ground by a shoe, or, if desired, by a small wheel.

What I claim, and desire to secure by Letters Patent, is—

The tail-bar C, hinged to the bar A, as described, and having the supporting-wheel V at its rear end, in combination with the lever Y, for adjusting the inclination of the cutters, when these several parts are constructed, arranged and operated in the manner and for the purpose set forth.

MARTIN HALLENBECK.

Witnesses:
E. J. MILLER,
RICHD. VARICK DE WITT.